United States Patent [19]

Ashorn et al.

[11] 4,100,155

[45] Jul. 11, 1978

[54] METHOD OF CONDENSING AND/OR POLYMERIZING SULFONATED LIGNIN CONTAINING MATERIALS

[75] Inventors: Theodore Heinrich Gustave Ashorn; Paul Elis Laine, both of Tampere, Finland

[73] Assignee: G. A. Serlachius Oy, Mantta, Finland

[21] Appl. No.: 757,070

[22] Filed: Jan. 5, 1977

[30] Foreign Application Priority Data

Jan. 30, 1976 [FI] Finland .................................. 752488

[51] Int. Cl.² .............................................. C07G 1/00
[52] U.S. Cl. ................................................ 260/124 R
[58] Field of Search ........................ 260/124 A, 124 R

[56] References Cited

U.S. PATENT DOCUMENTS

| | | | |
|---|---|---|---|
| 3,138,555 | 6/1964 | King et al. | 260/124 R |
| 3,476,740 | 11/1969 | Markham et al. | 260/124 R |
| 3,544,460 | 12/1970 | Markham et al. | 260/124 R |
| 3,668,123 | 6/1972 | Steinberg et al. | 260/124 R |

FOREIGN PATENT DOCUMENTS 1,769,903  7/1971  Fed. Rep. of Germany ... 260/124 R

Primary Examiner—Delbert R. Phillips
Attorney, Agent, or Firm—Toren, McGeady and Stanger

[57] ABSTRACT

A method for polymerizing sulfonated lignin containing materials by adjusting the pH of the materials to a pH below 7, adjusting the moisture content of the materials to a value sufficient to allow the conversion to proceed, but less than 15 percent, and then subjecting the thus treated materials to heating at a temperature from 80° to 225° C in a manner to maintain the moisture content of the material at a value sufficient to allow the conversion to proceed, but less than 15 percent, and for a time period sufficient to form products having a viscosity of at least 25 percent higher than the viscosity of the starting material. The products obtained are useful as dispersants and extenders.

5 Claims, No Drawings

METHOD OF CONDENSING AND/OR POLYMERIZING SULFONATED LIGNIN CONTAINING MATERIALS

BACKGROUND OF THE INVENTION

The object of the invention is a method of condensing and/or polymerising sulfonated lignin containing materials by means of which the viscosity, molecular weight and the efficacy of the materials may be substantially increased.

According to the invention polymers based on sulfonated lignins are being produced in a substantially dry state and at relatively low temperature and the end products thus obtained exhibit remarkably increased viscosities. The novel and surprising feature of the invention is not so much the increase in molecular weight as the simultaneous pronounced viscosity increase.

A main source of sulfonated lignin are residual pulping liquors of wood, straw or bagasse. In the sulfite pulping process the lignocellulosic material is digested with a bisulfite or sulfite salt solution, whereby a sulfonated lignin containing solution is formed, which is commonly referred to as spent sulfite liquor. In other pulping processes a spent liquor is obtained which does not contain sulfonated lignin. The lignins thus obtained can be sulfonated by additional treatment whereby sulfonated lignins, also suitable for the preparation of the material according to the invention, are obtained.

It is known that the sulfonated lignin containing products obtained by the above mentioned processes differ substantially as to their composition and the chemical structure of their various constituents. Furthermore, many of the commercially available products are prepared by enriching the sulfonated lignin material or by chemically modifying one or more of the components of the spent liquor. Although the composition of such preparations may vary in many different ways, they still constitute sulfonated lignin containing material also known as lignosulfonates. As a group of compounds the lignosulfonates are invariably polydisperse and are described with particular thoroughness in the book 'Lignins' edited by K. Sarkanen & C. Ludwig, Wiley-Interscience.

Of the millions of tons of sulfonated lignin produced annually only a small fraction is currently finding industrial utilization. Furthermore, utilization for the most part is confined to whole spent sulfite liquor exhibiting viscosities of several hundred cP as 50% solutions at room temperature and containing sulfonated lignin matter that for more than 60% falls into a molecular weight range of under 5000.

Products of higher average molecular weight and viscosities are being offered on the market as premium priced specialty items. These compounds are attracting considerable attention because of their enhanced usefulness in - for instance - such diverse materials as dispersion agents for organic dyestuffs, precipitation agents for soluble protein or as additives or extenders for glues.

For the most part these relatively high molecular weight lignosulfonates are derived by costly fractionation of sulfite spent liquor. However, spent sulfite liquor solids have also been polymerised by a method described in Canadian patent 436 469. Said patent discloses acid polymerisation of lignosulfonates in an aqueous medium to produce products claimed useful for oil well drilling muds and other applications. Accordingly, highly corrosive solutions warranting very special and costly manufacturing equipment need to be handled for prolonged periods of time at temperatures up to 180° C and pH values less than 1. A further drawback severely limiting any polymerisation technique in solution is the fact that the reaction is accompanied by a simultaneous increase in the viscosity of the medium. For the reasons of technical feasibility, polymerisation in concentrated, i.e. already very viscous solutions is therefore limited to minor increases in the molecular weight while polymerisation in the dilute state would prove excessively costly and run the risk of concurrent hydrolysis to products having a lower molecular weight or being more polydisperse as they contain hydrolysed matter in addition to condensed matter.

A method for heating lignin sulfonates in the dry state is described in U.S. Pat. No. 3 476 740. Accordingly a sulfonated lignin containing material is subjected to heat treatment between temperatures of 200° and 330° C to produce products useful in drilling muds and for dispersing applications. Because the preferred temperature range employed, 230° to 270° C, is above the ignition temperature of the treated material and the energy input is is sufficiently large to cause homolytic and other breakdown of the sulfonated lignin material, it is found necessary to first stabilize the lignin sulfonate by oxidation. Similarly, German Pat. 1769903 also discloses a method for heating lignin sulfonates at temperatures above 150° C leading to useful products exhibiting lower viscosity than the starting material.

By contrast, the present invention aims at producing substantially water soluble condensation products of sulfonated lignins which are commercially attractive whereby the method is sufficiently mild as to give rise to a minimum of side reactions.

The characteristics of the invention appear from the appended Claims.

DESCRIPTION OF THE PREFERRED EMBODIMENTS

As a result of this method water and some volatile acidic substances are eliminated and the viscosity of an aqueous solution of the treated product is substantially increased. The end products of the reaction are readily identified by their viscosities and the acid condensation reaction is therefore easily monitored.

As the efficacy of the sulfonated lignin products for any given application seems to be closely related to the average molecular weight, the acid condensation reaction according to the invention provides a convenient means for "taylormaking" lignosulfonates for any specific industrial application.

While wide variations in time, temperature and pH are possible within the scope of our invention, it is judged that pH is by far the overriding factor for achieving the best possible end result in product properties as well as the economics of manufacture. Selection of the pH range to fall below 7 is based on the consideration that lower reaction temperatures and shorter heating time — spelling better control of the reaction — are afforded by adjusting the pH of the dried material downward before heating.

With respect to temperature and reaction time, it has been established that the higher the reaction temperature the faster the acid condensation will proceed and the shorter the reaction time will be.

Vital, if not also rate controlling, to achieving rapid and continuous increase in viscosity is the presence of small amounts of water as the condensation will not proceed under conditions of absolute dryness. Generally speaking, all commercial lignosulfonate based materials do contain several percent of water. In addition to the water of reaction formed this amount is generally sufficient to bring about a substantial increase in viscosity over prolonged periods of time if care is taken that the reaction does not run dry. For processing reasons the moisture of the solids undergoing reaction is best kept constant at between 1 to 7 percent. However, during the condensation reaction the products thus exist in the substantially dry state, i.e. in a state where their physical properties resemble that of a solid rather than that of a liquid. This is usually the case when the amount of water present is less than 15%.

While in general we prefer to operate a two step process the first step of which consists of drying the sulfonated lignin containing material in a conventional spray drying equipment followed by a second step of acid condensation under specific conditions using suitably modified belt or tray driers, it is equally possible to consolidate the drying and heating steps into a single continuous process such as by spray drying the product and immediately heating the same in a fluidized bed within the temperature range specified or by drying and heating the product in a continuous kiln.

As mentioned earlier any sulfonated lignin containing material may be used as a starting material whether the material is spent sulfite liquor containing significant amounts of carbohydrates, or constitutes purified or fractionated and therefore less polydisperse material derived from sulfonated lignin. The starting material may also contain calcium, sodium, magnesium or any other cations and may have been modified by or blended with other chemicals or materials. In turn, the acid polymerised reaction products may receive further chemical treatment as desired.

To illustrate the present invention the following more detailed examples are presented describing modes of carrying out the invention as well as the use of the products obtained thereby.

The acid condensation reaction was conducted in a 500 ml steel vessel having a small orifice and being rotated in a thermostat controlled oil bath. The charge of product generally amounted to 150 g and the temperature given denotes the temperature prevailing within the reaction charge.

Unless otherwise specified all viscosities were measured at 23° C using a Brookfield viscosimeter at 30 rpm. The viscosity measurements were made in 40% and 25%, respectively, aqueous solutions but it is self-evident that they may also be carried out e.g. in a 50% solution, as is known in the art, whereby as a general rule may be said that the more concentrated the solution is the greater will the viscosity change be. The water content was in all tests about 4% both before and after the reaction. The pH values given refer to 3% solutions in distilled water.

EXAMPLE 1

The effect of pH value and reaction temperature on the viscosity of a sulfonated lignin containing material.

To a 55% spent liquor derived from a for alcohol fermented calcium based spruce sulfite spent liquor obtained from the production of rayon grade cellulose, was added sufficient 50% sulfuric acid to give product pH values of 3.5 and 4.0. The precipitated calcium sulfate was removed and the solution taken to dryness using a Niro design laboratory spray drier. The dried products exhibited calcium contents of 6.5% and 6.7%, respectively. The results are given in the following table.

TABLE 1

Properties of products prepared according to Example 1; acid condensation 5 hours at various temperatures

| Sample | Reaction temp. ° C | pH before/after heating | | Viscosity 40 % soln. cP before/after heating | | % reducing matter before/after heating | |
|---|---|---|---|---|---|---|---|
| 0 | — | 3.5 | — | 28 | — | 15.3 | — |
| 1 | 120 | 3.5 | 3.6 | 28 | 32 | 15.3 | 12.6 |
| 2 | 140 | 3.5 | 3.7 | 28 | 40 | 15.3 | 11.4 |
| 3 | 160 | 3.5 | 3.8 | 28 | 440 | 15.3 | 11.3 |
| 4 | 165 | 3.5 | 3.9 | 28 | 4500 | 15.3 | 11.0 |
| 5 | 170 | 3.5 | 3.9 | 28 | >100000 | 15.3 | 11.0 |
| 6 | — | 4.0 | — | 30 | — | 15.3 | — |
| 7 | 120 | 4.0 | 4.1 | 30 | 32 | 15.3 | 13.3 |
| 8 | 140 | 4.0 | 4.2 | 30 | 36 | 15.3 | 10.7 |
| 9 | 160 | 4.0 | 4.3 | 30 | 30 | 15.3 | 10.5 |
| 10 | 165 | 4.0 | 4.3 | 30 | 500 | 15.3 | 10.0 |
| 11 | 170 | 4.0 | 4.4 | 30 | 1900 | 15.3 | 9.0 |

The efficacy of the acid condensation is illustrated by the following tests for dispersions of plaster of Paris.

The testing procedure followed that given in U.S. Pat. No. 3 476 740. 500 mg of sulfonted lignin containing material was dissolved in 30 ml of distilled water and 50 g of commercial plaster of Paris was sifted into the solution. The resulting suspension was stirred in a Hamilton-Beach mixer for 10 seconds and the slurry was allowed to stand for another minute and again stirred for 15 seconds. It was then poured from a height of 10 cm onto a glass plate. The area covered by the various samples is recorded in Table 2 and is proportional to the thinning efficiency of the dispersant employed.

TABLE 2

The efficacy of compounds prepared according to Example 1 on the thinning of plaster of Paris slurries.

| Sample | Area of gypsum patty in mm² |
|---|---|
| 0 | 11305 |
| 1 | 12660 |
| 2 | 14305 |
| 3 | 20100 |
| 4 | 15830 |
| 5 | 2826 |
| 6 | 10100 |
| 7 | 12265 |
| 8 | 14100 |
| 9 | 18859 |
| 10 | 16740 |
| 11 | 17430 |

The table shows that the best results are obtained with samples 3 and 9. By comparison with Table 1 it is seen that the best thinning effect is achieved when the viscosity is within the range of about 100 to 500 cP.

EXAMPLE 2

The effect of reaction time on the viscosity of a sodium based for Torula yeast fermented sulfite spent liquor.

To the 55% calcium based spent liquor exhibiting a reducing matter content of 7%, was added sufficient 55% sulfuric acid and sodium sulfate to precipitate all calcium as calcium sulfate and to yield a pH of 3.1. The calcium sulfate was removed by filtration and the clear solution taken to dryness by spray drying. The dried material containing 4% Na was submitted to acid condensation for various lengths of time at 140° C and the results are presented in Table 3.

TABLE 3

The acid condensation of for Torula yeast fermented sodium based spruce sulfite spent liquor at pH 3.1 and 140° C.

| Sample | Reaction time hrs at 140° C | pH before/after heating | | % reducing matter before/after heating | | Viscosity of 40 % soln., cP before/after heating | |
|---|---|---|---|---|---|---|---|
| 0 | 0 | 3.1 | — | 7.0 | — | 28 | — |
| 1 | 2 | 3.1 | 3.2 | 7.0 | 6.7 | 28 | 32 |
| 2 | 4 | 3.1 | 3.3 | 7.0 | 6.2 | 28 | 57 |
| 3 | 6 | 3.1 | 3.4 | 7.0 | 5.9 | 28 | 130 |
| 4 | 8 | 3.1 | 3.5 | 7.0 | 5.7 | 28 | 800 |
| 5 | 12 | 3.1 | 3.7 | 7.0 | 5.4 | 28 | 1900 |
| 6 | 18 | 3.1 | 3.7 | 7.0 | 5.3 | 28 | 6000 |

Kaolin tests

In this test the efficacy of condensed lignosulfonates are presented for the thinning of a kaolin clay suspension and for use as extender for phenolic glues.

0.6 g of sulfonated lignin containing material are dissolved in 300 ml of distilled water and 200 g of kaolin clay are added. The suspension is stirred for 2 minutes and the pH carefully adjusted to 4.5 with 0.1N $H_2SO_4$. The mixture is stirred for another 30 minutes and the pH, if needed, again adjusted to 4.5.

The viscosities of the various slurries are recorded in the following Table 4. They are inversely proportional to the thinning efficiency of the dispersant employed.

TABLE 4

The thinning efficiency of acid condensed material prepared according to Example 2 on a 40% kaolin clay suspension.

| Sample | Viscosity of 40 % kaolin suspension, cP at 30 rpm |
|---|---|
| 0 | 200 |
| 1 | 180 |
| 2 | 150 |
| 3 | 80 |
| 4 | 20 |
| 5 | 10 |
| 6 | 35 |

Plywood glue tests

The testing procedure followed that outlined by Forss and Fuhrmann in Finnish pat. appln. 2527/72.

160 g of sulfonated lignin containing material was dissolved in 300 g of water and the pH adjusted to 7.0. This solution was subsequently poured into 600 g of a commercial 40% phenol-formaldehyde precondensate resin followed by 10 g of paraformaldehyde. The glue is allowed to react for 1 h with stirring and is subsequently applied to 1.5 mm birch veneers at an amount of 150 g/m². The samples were turned into 3-ply plywood employing a press time of 5 minutes at 135° C and pressures of 16 kp/cm². Comparative dry and wet strength test results are presented in the following Table 5.

TABLE 5

Comparative dry and wet strengths of plywood samples glued with phenolic-formaldehyde resins extended with acid condensed sulfonated lignin prepared according to Example 2.

| Glue component Sample | Dry strength kg/cm² | Wet strength kp/cm² |
|---|---|---|
| 0 | 18.2 | 11.3 |
| 1 | 19.0 | 13.2 |
| 2 | 22.1 | 13.8 |
| 3 | 25.0 | 15.0 |
| 4 | 29.7 | 18.0 |
| 5 | 31.8 | 18.9 |
| 6 | — | — |

EXAMPLE 3

The effect of reaction time on the viscosity of a calcium based high molecular weight fractionally lime precipitated sulfonated lignin.

To 10 kg of 15% calcium based spruce spent sulfite liquor derived from a paper cook was added at 60° C a sufficient amount of a lime slurry to raise the pH to 11.5. The precipitated calcium lignosulfonate was collected and washed on the filter with 500 ml of 3% lime solution. The filter cake was then transferred to a beaker to which sufficient 50% sulfuric acid was added to give a pH of 3.0. The precipitated calcium sulfate was removed by filtration and the solution taken to dryness by spray drying. The thus purified, high molecular weight sulfonated lignin fraction exhibiting a calcium content of 4% was subsequently submitted to acid condensation at pH 3.0 and 140° C for various periods of time and the respective increases in viscosity and other data are set forth in Table 6.

The effect of reaction time at 140° C and pH 3.0 on the viscosity of a calcium based high molecular weight lignin sulfonate fraction obtained from spruce spent sulfite liquor by precipitation with lime.

| Sample | Reaction time, hrs | pH before/after heating | | % reducing matters before/after heating | | Viscosity of 25 % soln., cP before/after heating | |
|---|---|---|---|---|---|---|---|
| 0 | — | 3.0 | — | 7.5 | 7.5 | 17 | — |
| 1 | 3 | 3.0 | 3.1 | 7.5 | 7.5 | 17 | 20 |
| 2 | 6 | 3.0 | 3.3 | 7.5 | 7.5 | 17 | 60 |
| 3 | 9 | 3.0 | 3.4 | 7.5 | 7.5 | 17 | 400 |
| 4 | 12 | 3.0 | 3.5 | 7.5 | 7.5 | 17 | 800 |

Comparative tests were made with limed oil well drilling muds and the results are represented in Table 7.

TABLE 7

Comparative hot-rolled lime mud test results of acid polymerised material prepared according to Example 3.

| Sample | Gels 10 | s/10m. | Yield point | API water loss, ml |
|---|---|---|---|---|
| 0 | 3 | 5 | 1 | 6.2 |
| 1 | 3 | 4 | 0 | 5.6 |
| 2 | 2 | 2 | 0 | 5.3 |
| 3 | 2 | 2 | 0 | 4.4 |
| 4 | 3 | 4 | 0 | 4.6 |

The testing procedure followed that outlined for the sweet water test in the following Example 4 except that 7.8 g of $Ca(OH)_2$ and 7.8 ml of 25% NaOH solution are introduced into the mud immediately prior to addition of the sulfonated lignin containing material.

EXAMPLE 4

The effect of reaction time on the viscosity of an iron salt of a sulfonated lignin containing material.

Into a hot, for alcohol fermented calcium based spruce spent liquor having a dry matter content of 53%, are added 235 g of ferro sulfate, $7H_2O$/kg. The formed calcium sulfate is separated by filtering. The pH of the filtrate is adjusted to 3.0 and 2.0, respectively, and the filtrate is dried into a free flowing powder in spray drier. The materials thus obtained are acid condensed at 150° C and 100 ° C, respectively, for various lenghts of time and the viscosity increases are given in Tables 8 and 11.

TABLE 8

The effect of reaction time on the viscosity of an iron lignosulfonate prepared at 150° C and pH 3.0 according to Example 4.

| Sample | Reaction time hrs at 150° C | pH before/after heating | | % reducing matter before/after heating | | Viscosity of a 40 % soln., cP before/after heating | |
|---|---|---|---|---|---|---|---|
| 0 | 0 | 3.0 | — | 10.7 | — | 30 | — |
| 1 | 2 | 3.0 | 3.1 | 10.7 | 10.4 | 30 | 100 |
| 2 | 3 | 3.0 | 3.3 | 10.7 | 10.1 | 30 | 1000 |
| 3 | 4 | 3.0 | 3.6 | 10.7 | 9.7 | 30 | 1900 |
| 4 | 5 | 3.0 | 3.8 | 10.7 | 9.3 | 30 | 3000 |
| 5 | 6 | 3.0 | 3.9 | 10.7 | 8.9 | 30 | 4500 |

In the following the advantageous results obtained with sweet water and gyp drilling muds are given.

Test results with a sweet water drilling mud 500 ml of a 9.5% sodium bentonite solution (yield value 77) was prepared in distilled water. It was kept for 16 hrs at 90° C. When cooled to room temperature 8.7 g of sulfonated lignin containing material is added as well as 3 ml of a 25% NaOH-solution while mixing with a Hamilton-Beach-mixer. Thereafter the mud is placed into a heating chamber and rotated therein for 16 hours at 90° C. Thereafter the mud is cooled to room temperature and stirred for 5 minutes before testing.

TABLE 9

Comparative test results of a sweet water drilling mud containing acid polymerized iron lignosulfonate prepared according to Example 4.

| Sample | Gels 10 | s/10m. | Yield point | API water loss, ml |
|---|---|---|---|---|
| 0 | 2 | 3 | 3 | 7.8 |
| 1 | 2 | 3 | 3 | 6.6 |
| 2 | 2 | 3 | 4 | 6.0 |
| 3 | 2 | 3 | 5 | 5.8 |
| 4 | 2 | 3 | 6 | 5.4 |
| 5 | 2 | 3 | 6 | 5.1 |

Test results with a gyp containing mud

The mud was prepared in the same manner as the sweet water mud except that 7.8 g of $CaSO_4 . \frac{1}{2} H_2O$ was added to the mixture of lignin product and NaOH.

TABLE 10

Comparative test results of a hot-rolled gyp mud containing acid polymerised iron lignosulfonate prepared according to Example 4.

| Sample | Gels 10 | s/10 m. | Yield point | API water loss, ml |
|---|---|---|---|---|
| 0 | 14 | 26 | 19 | 16.6 |
| 1 | 10 | 20 | 10 | 13.6 |
| 2 | 1 | 3 | 1 | 5.4 |
| 3 | 1 | 3 | 1 | 5.6 |
| 4 | 2 | 3 | 3 | 4.6 |
| 5 | 2 | 3 | 3 | 4.6 |

The testing procedures generally correspond to the methods published by the American Petroleum Institute. The viscosity measurements, the gels and the yield points have been determined with a Fann-V viscosimeter and the water loss by using 400 ml of mud and a pressure of 7 $kgN_2/cm^2$ for 30 minutes.

TABLE 11

The effect of reaction time on the viscosity of an iron lignosulfonate prepared according to Example 4 at 100° C and pH 2.

| Sample | Reaction time min. at 100° C | pH before/after heating | | Viscosity of 40% solution, cp before/after heating | |
|---|---|---|---|---|---|
| 1 | 30 | 2.0 | 2.0 | 30 | 100 |
| 2 | 60 | 2.0 | 2.0 | 30 | 500 |
| 3 | 90 | 2.0 | 2.0 | 30 | 5000 |
| 4 | 120 | 2.0 | 2.0 | 30 | 41000 |
| 5 | 200 | 2.0 | 2.0 | 30 | >200000 |

We claim:

1. Method for converting sulfonated lignin containing materials to substantially water soluble products comprising
    (a) adjusting the pH of the material such that a 3 percent aqueous solution of the material has a pH below 7;
    (b) adjusting the moisture content of the pH adjusted material to a value from 1 to 15 percent; and
    (c) subjecting the material from step (b) to heating at a temperature range from 80° to 225° C in a manner to maintain the moisture content of the material at a value sufficient to allow the conversion to proceed, but less than 15 percent, and for a time period sufficient to form products having viscosity at least 25 percent higher than the viscosity of the starting material, said viscosities being measured in a 50 percent aqueous solution at room temperature.

2. The method of claim 1 wherein the material is adjusted to a moisture content between 1 to 7 percent.

3. The method of claim 1 wherein the pH is adjusted to not less than 1.

4. The method of claim 3 wherein the pH is adjusted between 2 and 4.

5. The method of claim 1 wherein the heating temperature is between 120° C to 150° C.

* * * * *